US012374487B2

(12) United States Patent
Shah et al.

(10) Patent No.: US 12,374,487 B2
(45) Date of Patent: Jul. 29, 2025

(54) CURRENT TRANSFORMER WITH CURRENT BRANCHES ON PRIMARY CONDUCTOR

(71) Applicant: Narayan Powertech Pvt. Ltd.

(72) Inventors: Chirag Shah, Vadodara (IN); Chetas Parikh, Vadodara (IN)

( * ) Notice: Subject to any disclaimer, the term of this patent is extended or adjusted under 35 U.S.C. 154(b) by 59 days.

(21) Appl. No.: 16/606,750

(22) PCT Filed: Apr. 19, 2017

(86) PCT No.: PCT/IB2017/000770
§ 371 (c)(1),
(2) Date: Oct. 19, 2019

(87) PCT Pub. No.: WO2018/193284
PCT Pub. Date: Oct. 25, 2018

(65) Prior Publication Data
US 2020/0051738 A1 Feb. 13, 2020

(51) Int. Cl.
*H01F 38/30* (2006.01)
*H01F 38/28* (2006.01)
*H01F 38/32* (2006.01)

(52) U.S. Cl.
CPC ............. *H01F 38/30* (2013.01); *H01F 38/28* (2013.01); *H01F 38/32* (2013.01)

(58) Field of Classification Search
CPC ...... H01F 38/30; H01F 27/2804; H01F 38/08; H01F 38/32; H01F 27/24; H01F 38/28; H01F 30/12; H01F 27/2823; H01F 2027/2809; H01F 27/38; H01F 2027/2819; H01F 27/28; H01F 27/324; G01R 15/183; G01R 15/185; G01R 19/0092; H01H 71/125
See application file for complete search history.

(56) References Cited

U.S. PATENT DOCUMENTS 1,835,028 A * 12/1931 Eiseman .................. F23N 5/20 361/254
2,153,377 A * 4/1939 Kramer .................. G01R 19/20 324/120
3,851,239 A * 11/1974 Suzuki .................... H02M 3/28 363/15
3,886,434 A * 5/1975 Schreiner .............. H01F 27/321 315/411

(Continued)

FOREIGN PATENT DOCUMENTS

EP 0704867 3/1998

*Primary Examiner* — Yoshihisa Ishizuka
*Assistant Examiner* — Carter W Ferrell
(74) *Attorney, Agent, or Firm* — Kearney, McWilliams & Davis, PLLC; William Yarbrough

(57) ABSTRACT

Embodiments described herein comprise a current transformer having a primary winding with multiple primary parallel branches that divide the primary current, and a secondary winding which is placed in any one, or more, branches. The current thus divided in the primary branches produces an alternating magnetic flux which induces alternating current in the secondary winding for an end user application. The invention disclosed herein reduces the weight and size of the current transformer drastically compared to the existing conventional current transformers.

18 Claims, 4 Drawing Sheets

(56) References Cited

U.S. PATENT DOCUMENTS

| | | | | |
|---|---|---|---|---|
| 6,611,136 | B2 * | 8/2003 | Clausse | G01R 19/25 324/117 R |
| 7,576,607 | B2 * | 8/2009 | Lee | H03F 3/45475 330/195 |
| 7,616,088 | B1 * | 11/2009 | Baker | H01F 17/0033 336/229 |
| 2004/0196129 | A1 * | 10/2004 | Camwell | H01F 27/34 336/173 |
| 2008/0129227 | A1 * | 6/2008 | Hiramatsu | H05B 41/245 315/312 |
| 2008/0239759 | A1 * | 10/2008 | Nakahori | H02M 3/337 363/20 |
| 2010/0270999 | A1 * | 10/2010 | Lai | H01F 19/04 323/361 |
| 2011/0285210 | A1 * | 11/2011 | Lemmens | H01F 38/14 307/104 |
| 2013/0328655 | A1 * | 12/2013 | Catalano | H05K 3/30 336/200 |
| 2015/0085536 | A1 * | 3/2015 | Miyauchi | B60L 50/51 363/21.16 |
| 2019/0198238 | A1 * | 6/2019 | Adar | H01F 41/04 |

* cited by examiner

CURRENT TRANSFORMER WITH CURRENT BRANCHES ON PRIMARY CONDUCTOR

BACKGROUND

Conventional current transformers have one primary winding.

Embodiments of the inventive subject matter generally relate to techniques for transforming current. More particularly, the embodiments of the inventive subject matter relate to a current transformer having multiple primary winding branches.

SUMMARY

Embodiments described herein may include a current transformer. The current transformer may comprise a primary winding configured to carry a primary current wherein the primary winding has one or more primary winding branches coupled in parallel and one or more secondary windings having a plurality of turns configured to induce a secondary current from at least one of the one or more of the primary winding branches and an end user coupled to the secondary winding.

Embodiments described herein may include the current transformer wherein there are two primary winding branches.

Embodiments described herein may include the current transformer wherein there is one secondary winding inducing the secondary current from one of the primary winding branches.

Embodiments described herein may include the current transformer wherein there is one secondary winding on each of the two primary winding branches inducing the secondary current from each of the primary winding branches.

Embodiments described herein may include the current transformer wherein each of the primary winding branches has different impedance, and the primary current is divided among the primary branches based on their impedance.

Embodiments described herein may include the current transformer wherein the primary current is divided evenly between the primary current branches.

Embodiments described herein may include the current transformer wherein there are three primary winding branches.

Embodiments described herein may include the current transformer wherein the primary current is divided evenly between the three primary current branches.

Embodiments described herein may include the current transformer wherein there is one secondary winding on each of the three primary winding branches inducing the secondary current from each of the three primary winding branches.

Embodiments described herein may include the current transformer wherein the primary current is an alternating current.

Embodiments described herein may include the current transformer wherein there are a plurality of primary winding branches and the primary current in each of the primary winding branches has a different value.

Embodiments described herein may include the current transformer wherein the end user is configured to measure the primary current.

Embodiments described herein may include the current transformer wherein the end user is configured to supply auxiliary power to a circuit.

Embodiments described herein may include a method of reducing a current to an end user comprising flowing a primary current through a primary winding in a current transformer, dividing the primary current between a plurality of primary winding branches which are in parallel in the primary winding, inducing a secondary current in at least one secondary winding from one or more of the primary winding branches, and sending the secondary current to the end user.

Embodiments described herein may further comprise measuring the secondary current with the end user.

Embodiments described herein may further comprise dividing the primary current by changing the impedance of at least one of the primary branches and thereby flowing more, or less, current through that branch.

Embodiments described herein may further comprise dividing the primary current evenly between the primary winding branches.

Embodiments described herein may further comprise inducing the secondary current through multiple secondary windings coupled to each of the primary winding branches.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary apparatus, methods, techniques, and instruction sequences that embody techniques of the present inventive subject matter. However, it is understood that the described embodiments may be practiced without these specific details.

Figure 1:
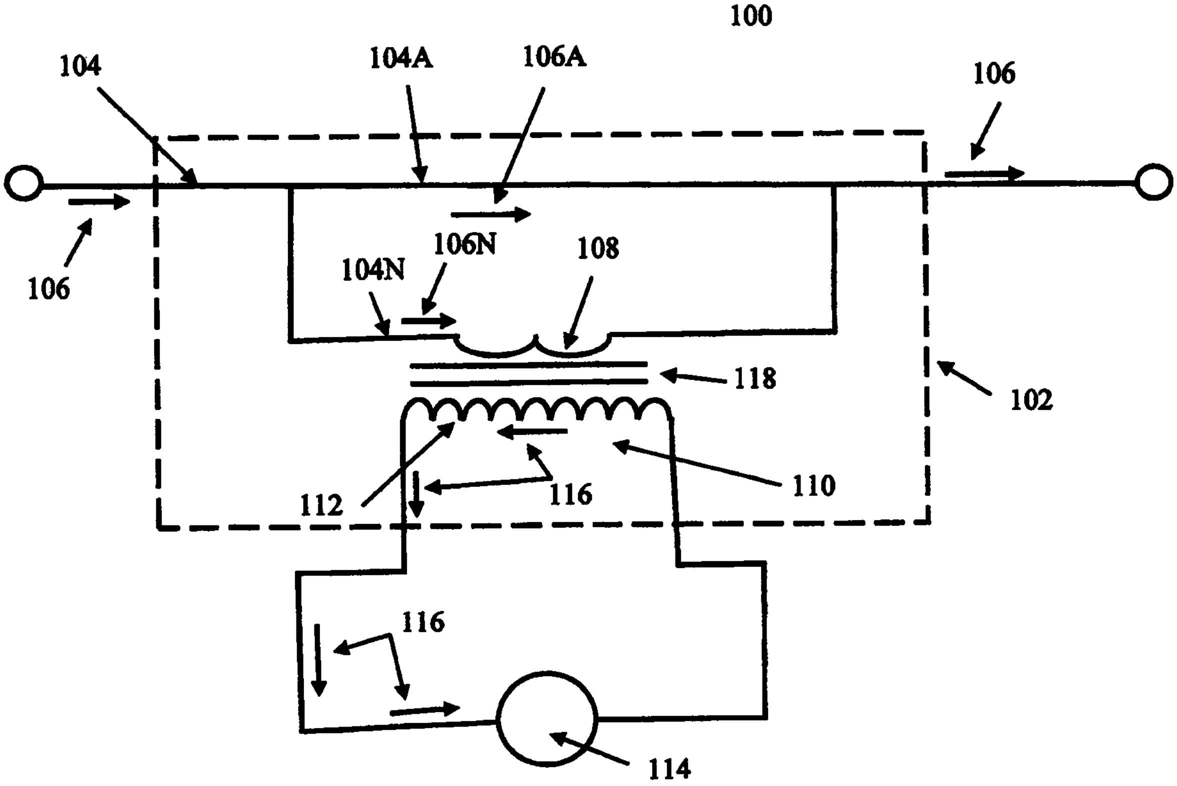
FIG. 1 depicts a diagram illustrating a circuit having a current transformer in an embodiment.

FIG. 1 depicts a schematic drawing of a circuit 100 having a current transformer 102 in an embodiment. The current transformer 102 may consist of a primary winding 104 having a plurality of primary winding branches 104A-N. The primary winding 104 is configured to carry a primary current 106 in a parallel circuit through the current transformer 102 via the primary winding branches 104A-N. The primary current 106 will be divided in the primary winding branches 104A-N based on the branch parameters, as will be discussed below. One or more of the primary winding branches 104A-N may have one or more turns 108. At least one of the primary winding branches 104A-N is connected to or coupled with a secondary winding 110. The secondary winding 110 may have a plurality of turns 112. The secondary winding 110 may be coupled to an end user 114. The current transformer 102, as shown, produces a secondary current 116 in the one or more secondary windings 110, which is proportional to the primary current 106 being carried through the corresponding primary winding branch 104A-N. As shown, there is a core 118 located proximate the primary winding branch 104 and secondary winding 110. Because the primary current 106 is divided in the corresponding primary winding branches 104A-N, the resulting reduction in current in the corresponding primary winding branches 104A-N allows for fewer turns 112 in the secondary winding 110. The fewer turns 112 allow the current transformer 102 to be much smaller and lighter than conventional current transformers.

The primary winding 104 may be connected in series with the load and may carry the current 106 flowing to the load. The primary winding 104 may have any number of the primary winding branches 104A-N. The primary winding branches 104A-N are configured to split the primary current 106 between the branches based on the impedance and/or resistance of each of the primary winding branches 104A-N. For example, if the impedance were the same in each of primary winding branches 104A-N, each of the branches would carry a substantially equal portion of the current 106. In another example, each of the primary winding branches 104A-N could have a different impedance and/or resistance. Therefore, one of the primary winding branches 104A-N may carry a larger proportion of the current 106 while the other branches carry a smaller portion of the current 106. The smaller portion of current 106 flowing through one or more of the primary winding branches 104A-N may allow the secondary windings 110 to have significantly less turns 112 than a conventional current transformer as will be discussed in more detail below.

The primary winding branches 104A-N that are coupled to the secondary windings 110 may have any number of turns 108 including one turn, or a flat turn. The number of turns 108 in the primary winding branches 104A-N will depend on the specifications of the current transformer and what the desired turn ratio is for each particular primary winding branch 104A-N. Each of the primary winding branches 104A-N can have any configuration including, but not limited to, a single flat turn, a coil of heavy duty wire wrapped around the core, a conductor, a bus bar, and the like.

When the current transformer 102 is integrated with electronic circuits, the input, or the end user application, may be AC or DC.

The secondary winding 110 is located in close proximity to the one or more turns 108 of one or more of the primary winding branches 104A-N. The smaller portion of the current 106 flowing through the one or more primary winding branches 104A-N produces an alternating magnetic flux in the secondary winding 110. The magnetic flux then induces alternating current, the secondary current 116, in the secondary winding 110. The secondary current 116 in the secondary winding 110 is proportional to the current flowing through the primary winding branch 104. The secondary winding 110 may have any number of turns 112 between one and several thousand, in order to take a relatively large load current 106 in the one or more primary winding branches 104A-N and convert it to the smaller amplitude current 116. The ratio between the number of turns 108 in the one or more primary winding branches 104A-N and the number of turns 112 in the associated secondary winding 110 is the turn ratio or branch turn ratio. The branch turn ratio will be specifically designed for the secondary current 116 needs of the end user 114 in the secondary winding 110. Because each of the branch currents 106A-N has a reduced current, the number of windings 112 in each of the secondary windings 110 is greatly reduced from traditional current transformers. The number of turns 112 and therefore branch turn ratio will be specified based on any suitable uses for the current transformer 102 including, but not limited to, the ratio, the burden, or class.

The end user 114 may be any suitable device for use with the secondary branch current 116. The end user 114 application may be for measurement of the primary current 106, for example with an ammeter in one embodiment. It should be appreciated that the end user 114 may be any suitable device using AC or DC including, but not limited to, measurement devices for revenue metering, power factor meters, watt-hour meters, protective systems including but not limited to protective relay devices, power generation, plant monitoring systems, fault recorders, overall electric grid monitoring, building (energy) management systems, controls, sensors, instrumentation, auxiliary supplies, self-power supplies, and the like.

Figure 2:
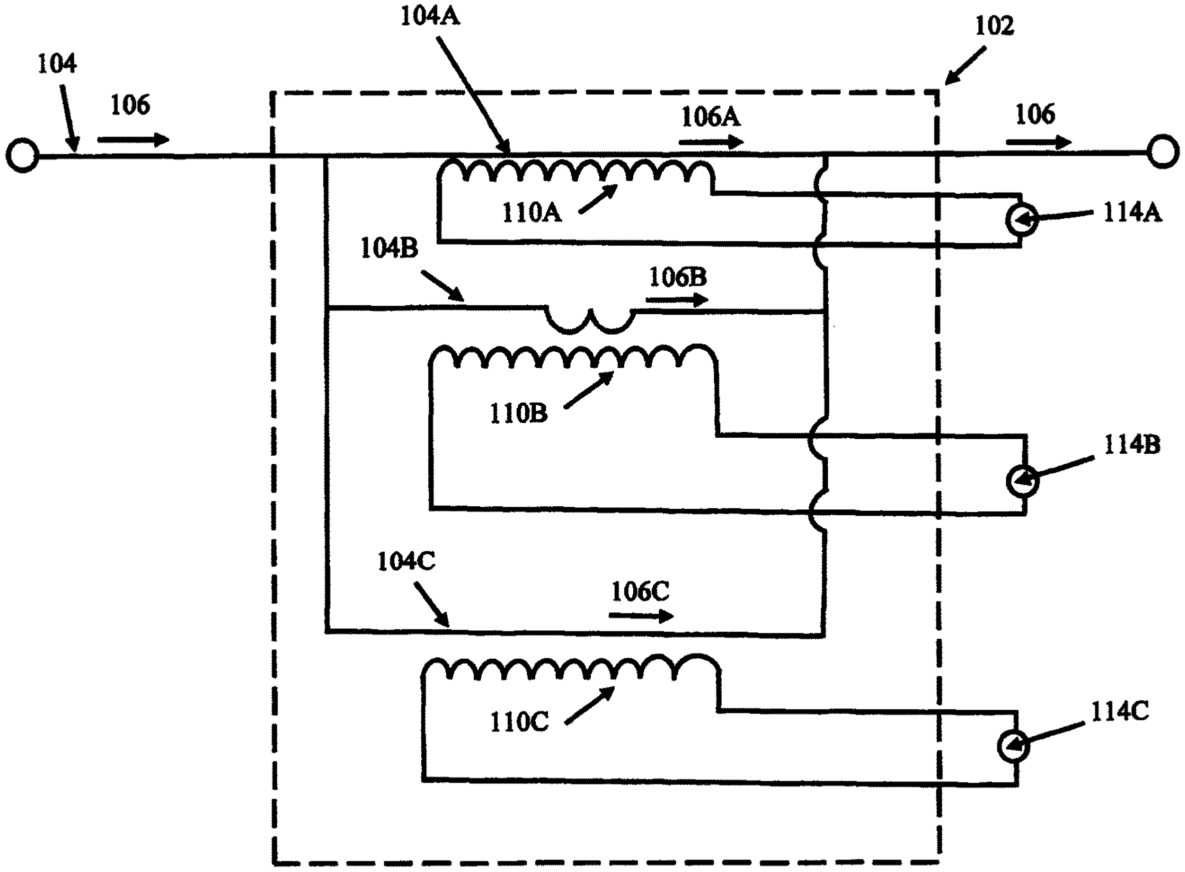
FIG. 2 depicts a diagram illustrating a circuit having a current transformer in an embodiment.

FIG. 2 depicts an example of the current transformer 102 having three primary winding branches 104A-C. In this embodiment, each of the primary winding branches 104A-C are coupled to secondary windings 110, although it should be appreciated that there may be any suitable number of secondary windings 110. The primary current 106A-C in the primary winding branches 104A-C will be divided based on the impendence/resistance in each of the primary winding branches 104A-C. In one example, the primary current 106A-C in the primary winding branches 104A-C is substantially equal at 33.3% in each branch due to equal impedance/resistance in each branch. In another example, the primary current 106A may be 50% of the total primary current 106 and the primary current 106B and 106C are each 25% of the total primary current 106. Although several examples of primary current 106A-N have been described it should be appreciated that any feasible current division between the primary winding branches 104A-C is envisioned.

The secondary windings 110A-C associated with each of the primary winding branches 104A-C may have any suitable number of turns 112. The number of turns 112 in each secondary winding 110A-C may be specifically designed based on the specific end user 114A-C. Therefore, the number of turns 112 in each of the secondary windings 110A-C may be different or the same. The reduced primary current 106A-C in each of the primary winding branches 104A-C allows the number of turns 112 in each of the secondary windings 110A-C to be greatly reduced relative to a conventional current transformer. Although there are secondary windings 110A-C associated with each of the primary winding branches 104A-C, it should be appreciated that there may be any suitable number or configuration of secondary windings 110. Further, it should be appreciated that although three primary winding branches 104A-C are shown, there may be more primary winding branches 104A-N to suit the needs of the current transformer 102 and the end users 114.

Figure 3:
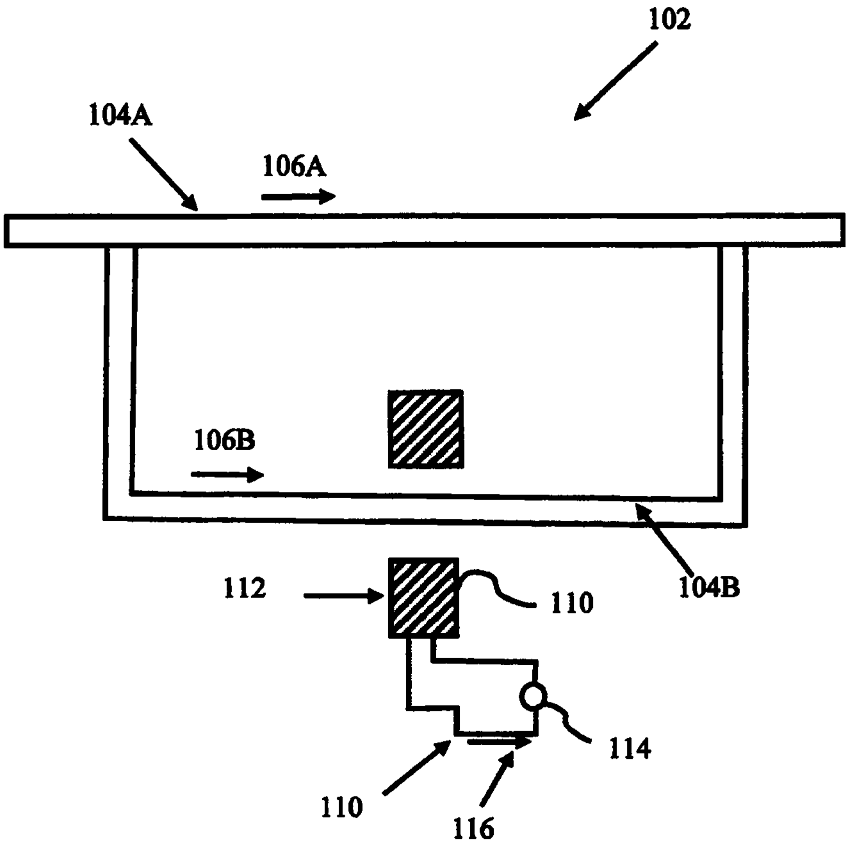
FIG. 3 depicts a diagram illustrating a circuit having a current transformer in an embodiment.

FIG. 3 depicts the current transformer 102 having multiple primary winding branches 104A-B coupled to the secondary winding 110 on one of the branches. In this example, the end user 114 is an ammeter for CT testing. In one embodiment, the primary current 106 is divided evenly between the two primary winding branches 104A and 104B. In this example, the primary current 106 is 10 A and the primary current 106A and 106B in each of the primary winding branches 104A and 104B is 5 A. Because the primary current 106 is divided, the observed output current by the end user 114 would also be divided proportional to the percentage of primary current 106B in the primary winding branch 104B. In this example, the observed output current is 2.222 mA. In another example, the primary current 106B being measured may be reduced more than half, by adding more primary winding branches 104A-N and/or increasing the impedance in the primary winding branch 106B. Thus, the 10 A primary current 106B may be reduced to any suitable percentage of the total primary current in a range lower than 50%.

The number of turns 112 in the secondary winding 110 will be reduced proportional to the reduction in current in the primary winding branch 104. Therefore, the size and weight of the secondary winding 110 will be greatly reduced in the current transformer 102 described herein. This size reduction will make the current transformer 102 much more compact than the conventional current transformers. This size reduction will greatly decrease the size of switch racks, switch gears, and panels where the current transformer 102 is used. Further, the space needed for storing the current transformer 102 will be greatly reduced. The weight and size reduction will make shipping and packing the current transformers 102 more affordable.

The current transformer 102 as described herein allows the primary current 106 rating to be greatly increased over conventional transformers because the primary current is divided between the primary winding branches 104A-N. For example, the current transformer 102 disclosed herein is able to handle current ratings of the primary current larger than 6000 A and up to approximately 20,000 A. Further, the current transformer 102 described herein has short time thermal current ratings that are greatly reduced for the 104N branch when compared to conventional transformers.

In another example, the primary current 106 is 4000 A in an 11 KV system voltage circuit. The ratio between the primary current 106 and secondary current 116 may be 4000 A/5 A. With this ratio, the secondary windings of a conventional current transformer would require approximately a 40-kilogram (88.2 Lb.) transformer and a cabinet at least 350×165×300 mm (13.8×6.5×11.6 in). Using the current transformer 102 having multiple primary branches 104A-N would reduce the size and weight of the current transformer significantly. For example, when using the system with the primary current 106 divided by 50% in two primary winding branches 104A and 104B, as depicted in FIG. 3, the current transformer 102 may have a weight reduction of at least 5-10 Kgs (11-22 pounds) and the overall size halved. This weight and size reduction could be more using a lower percentage of the split primary current 106A-N in the primary winding branches 104A-N using one of the methods described herein.

Figure 4:
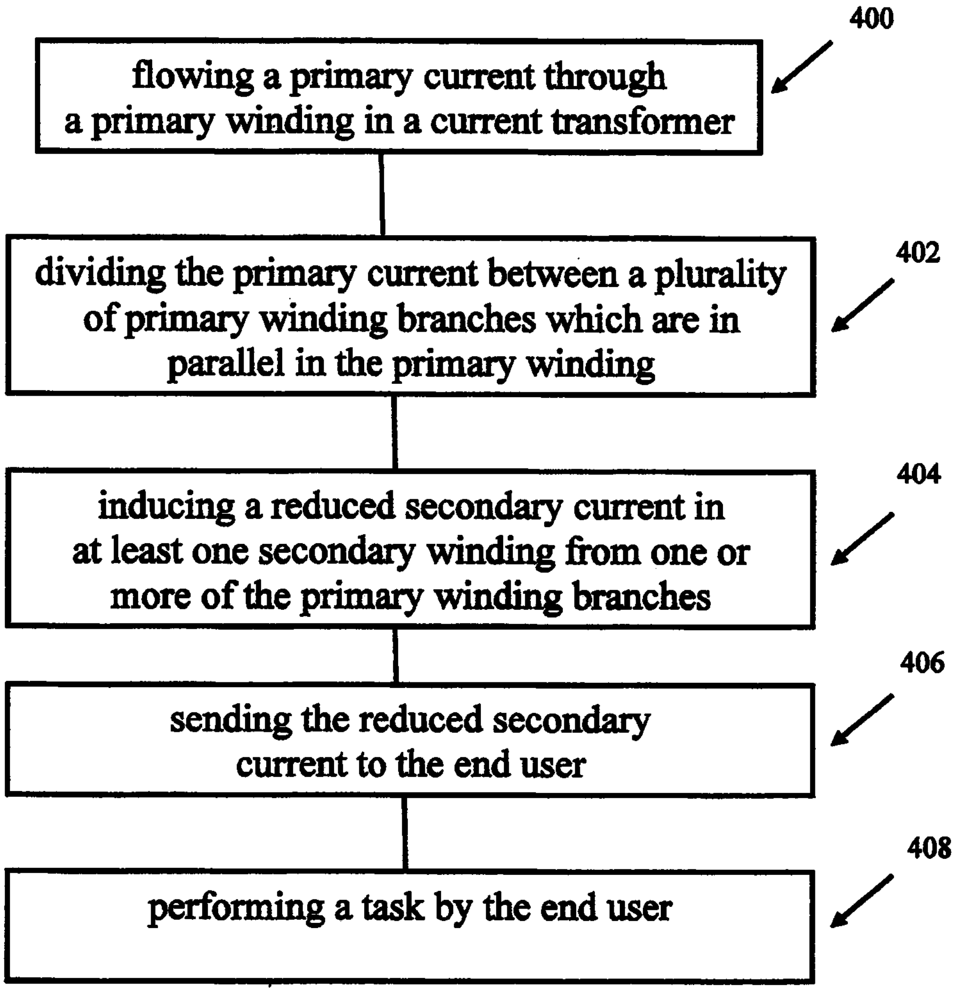
FIG. 4 depicts a flow diagram illustrating a method of operating a system including the current transformer in an embodiment.

FIG. 4 depicts a flow diagram illustrating a method of operating a system including the current transformer 102. The flow diagram begins at block 400 wherein a primary current 106 is flowed through a primary winding 104A-N of a current transformer 102. The flow diagram continues at block 402 wherein the primary current 106 is divided between the plurality of primary winding branches 104A-N. As described, herein the primary current 106 may be divided among any number of primary winding branches 104A-N with varying current in each of the primary winding branches 104A-N. The flow diagram continues at block 404 wherein a secondary current 116 is induced in one or more secondary windings 110. The configuration of the primary winding branches 104A-N and the secondary windings can be any configuration described herein. The flow diagram continues at block 406 wherein the secondary current is sent to the end user 114. The end user 114 may be any of the end user described herein. The flow diagram continues at block 408 where a task is performed by the end user 114. The task may be any suitable task with the secondary current including, but not limited to, measuring, supplying power, protection of circuits, any use described herein and the like.

While the embodiments are described with reference to various implementations and exploitations, it will be understood that these embodiments are illustrative and that the scope of the inventive subject matter is not limited to them. Many variations, modifications, additions and improvements are possible.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

We claim:

1. A current transformer, comprising:

a magnetic core, a primary current, a primary winding, two to a plurality of primary winding branches, two to a plurality of secondary windings and an end user;

said primary winding wound around said magnetic core and configured to carry the primary current wherein said primary winding is divided into two to a plurality of primary winding branches or a first set and second set of primary winding branches coupled in parallel;

each of said two to a plurality of primary winding branches carries a divided primary current of the primary current;

each of the two to a plurality of primary winding branches exhibits an impedance, resistance and one or more turns;

said each primary winding branch carrying the divided primary current variable based on said primary winding impedance, resistance, number of primary winding branches, number of primary winding turns, or a combination thereof;

each of the two to a plurality of primary winding branches, or each of said first set and second set of primary winding branches, is magnetically coupled to at least one secondary winding;

said two to a plurality of secondary windings having one to a plurality of turns configured to induce a secondary current in said at least one secondary winding from each of the plurality of said primary winding branch, the secondary current proportional to the divided primary current in one of the said two to a plurality of primary branches;

said at least one magnetically coupled secondary winding having a number of turns reduced proportional to said divided primary current in said magnetically coupled primary winding branch; and said end user coupled to at least one of said plurality of secondary windings.

2. The current transformer of claim 1, wherein said primary current in said primary winding is divided between said two to a plurality of primary winding branches or set of primary winding branches wherein each of the two to a plurality of primary winding branches or set of primary winding branches has a different current value.

3. The current transformer of claim 2, wherein each of the two to a plurality of secondary windings is magnetically coupled with at least one primary winding branch or set of primary winding branches which is positioned to cause at least one primary winding branch or set of primary winding branches to induce a reduced secondary current in at least one coupled secondary winding proportionate to the divided primary current of the at least one primary winding branch or set of primary winding branches.

4. The current transformer of claim 2, wherein at least one magnetically coupled secondary winding of the plurality of secondary windings is located in close proximity to at least one primary winding branch or set of primary winding branches inducing a secondary current in the at least one secondary winding from at least one primary winding branch.

5. The current transformer of claim 4, wherein said primary current is divided between primary winding branches, or set of primary winding branches, wherein current within each primary winding branch or set of primary winding branches is based on winding branch impedance, resistance, number, or a combination thereof, where each current is the same or different in each of the plurality of primary winding branches or set of primary winding branches.

6. The current transformer of claim 5, wherein there is at least one said secondary winding magnetically coupled to one of said two to a plurality of primary windings, or a first set, or second set of primary winding branches, where the primary current is divided evenly or unevenly between two to a plurality of primary current branches.

7. The current transformer of claim 6, wherein said at least one secondary winding, being magnetically coupled to said at least one primary winding branch or set of primary winding branches, induces a secondary current in said each secondary windings coupled to a primary winding branch or set of primary winding branches;

said secondary winding current proportional to said current in each primary winding branch or set of primary winding branches.

8. The current transformer of claim 4, wherein the primary current is divided evenly between two to a plurality of primary winding branches.

9. The current transformer of claim 4, wherein said two to a plurality of primary winding branches comprises primary winding branches or set of primary winding branches each exhibiting unevenly divided current.

10. The current transformer of claim 2, wherein said primary current is divided between two to a plurality of primary winding branches, or primary winding branch sets, and the current value in each of the two to a plurality of primary winding branches or branch sets is a different current value with correspondingly reduced received current in a secondary winding resulting in a reduced number of turns in the secondary winding.

11. The current transformer of claim 1, wherein the primary current is an alternating current or direct current.

12. The current transformer of claim 1, wherein the end user is configured to measure the primary current through measurement of an induced secondary current via an ammeter.

13. The current transformer of claim 1, wherein the end user is configured to supply a reduced current value auxiliary power to a circuit.

14. A method of reducing an induced secondary current in a current transformer in relation to a divided primary current, for sending to an end user comprising:

coupling a primary winding with a magnetic core and generating a primary current;

dividing said primary winding into two to a plurality of primary winding branches coupled in parallel;

each of said primary winding branches exhibiting one or more turns;

dividing current between two to a plurality of primary winding branches through changes in impedance, resistance, number of branches, number of primary winding turns, or a combination thereof;

flowing a primary current through said two to a plurality of primary winding branches;

separating primary winding branches into a first primary winding branch or set of primary winding branches and a second primary winding branch or set of primary winding branches;

coupling said first primary winding branch or set of primary winding branches to at least one secondary winding branch;

coupling said second primary winding branch or set of primary winding branches to at least another secondary winding branch;

inducing a secondary current in a secondary winding branch wherein the at least one coupled secondary winding is coupled with at least one primary winding branch or set of primary winding branches;

at least one of the at least one secondary winding branch and the at least another secondary winding branch having a number of turns reduced proportional to the divided current between the two to a plurality of primary winding branches; and coupling the end user to at least one of the at least one secondary winding branch or the at least another secondary winding branch.

15. The method of claim 14, wherein changing the impedance, resistance, number of branches, number of turns, or a combination thereof, in at least one primary winding branch allows flowing more or less current through each primary branch or set of primary branches.

16. The method of claim 15, wherein dividing the primary current between primary branches or set of primary branches further comprises dividing the primary current evenly or unevenly between winding branches.

17. The method of claim 16, wherein inducing a secondary current in said two to a plurality of secondary winding further comprises reducing secondary currents and secondary turns in said secondary winding or windings coupled to at least a first primary winding branch or first set of primary winding branches whereby smaller amplitude current allows for fewer secondary turns proportional to reduced primary branch currents and resultant decrease in transformer area, weight and size.

18. The method of claim 14, wherein the primary current is an alternating current or a direct current.

* * * * *